(No Model.) 3 Sheets—Sheet 2.
S. A. SHEPARD & F. P. LANG.
AUTOMATIC TROLLEY CATCH.
No. 469,750. Patented Mar. 1, 1892.
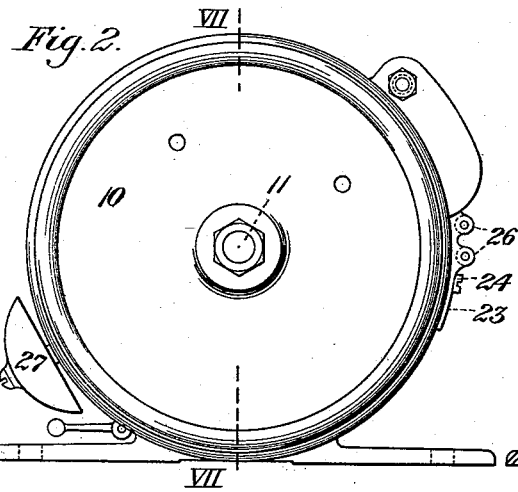
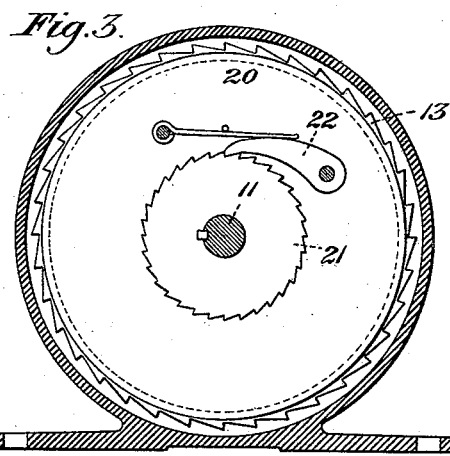
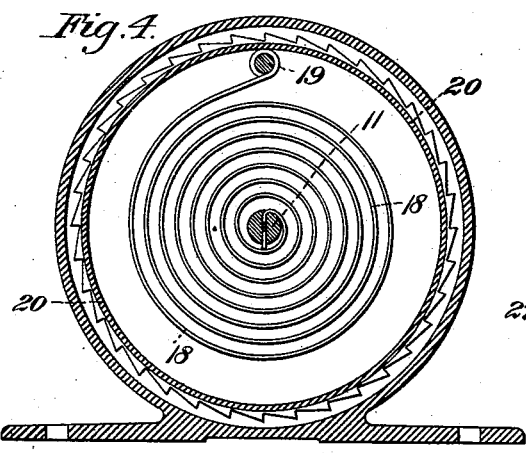
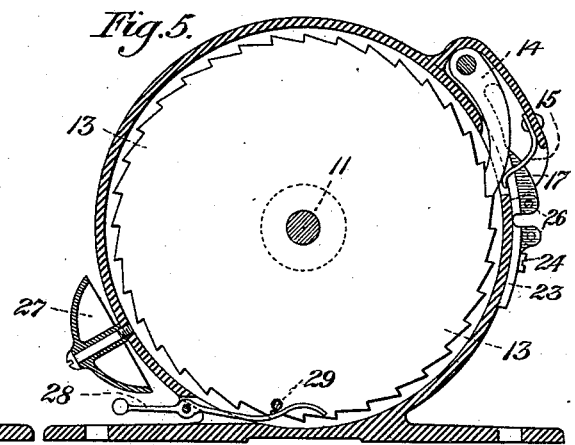
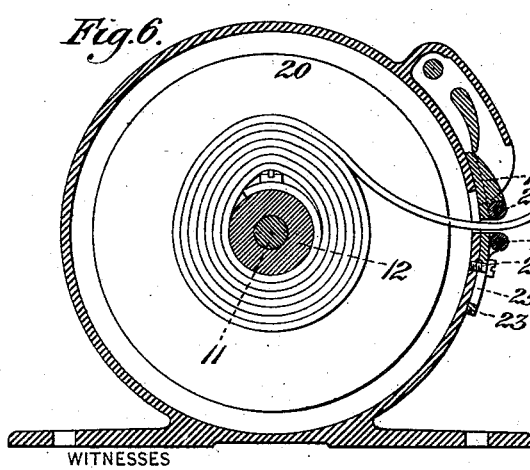
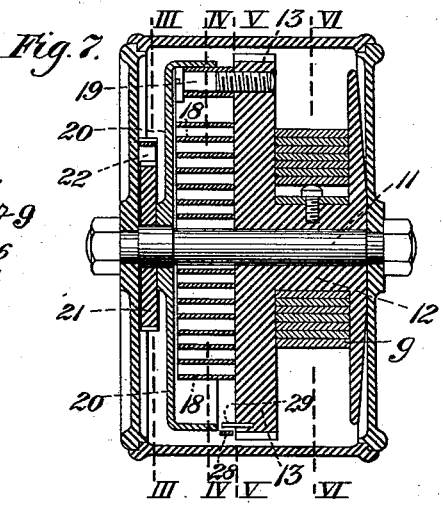
WITNESSES
Thomas W. Bakewell
N. M. Corwin
Inventors
Stephen A. Shepard
Frederick P. Lang
THE NORRIS PETERS CO., PHOTO-LITHO., WASHINGTON, D. C.

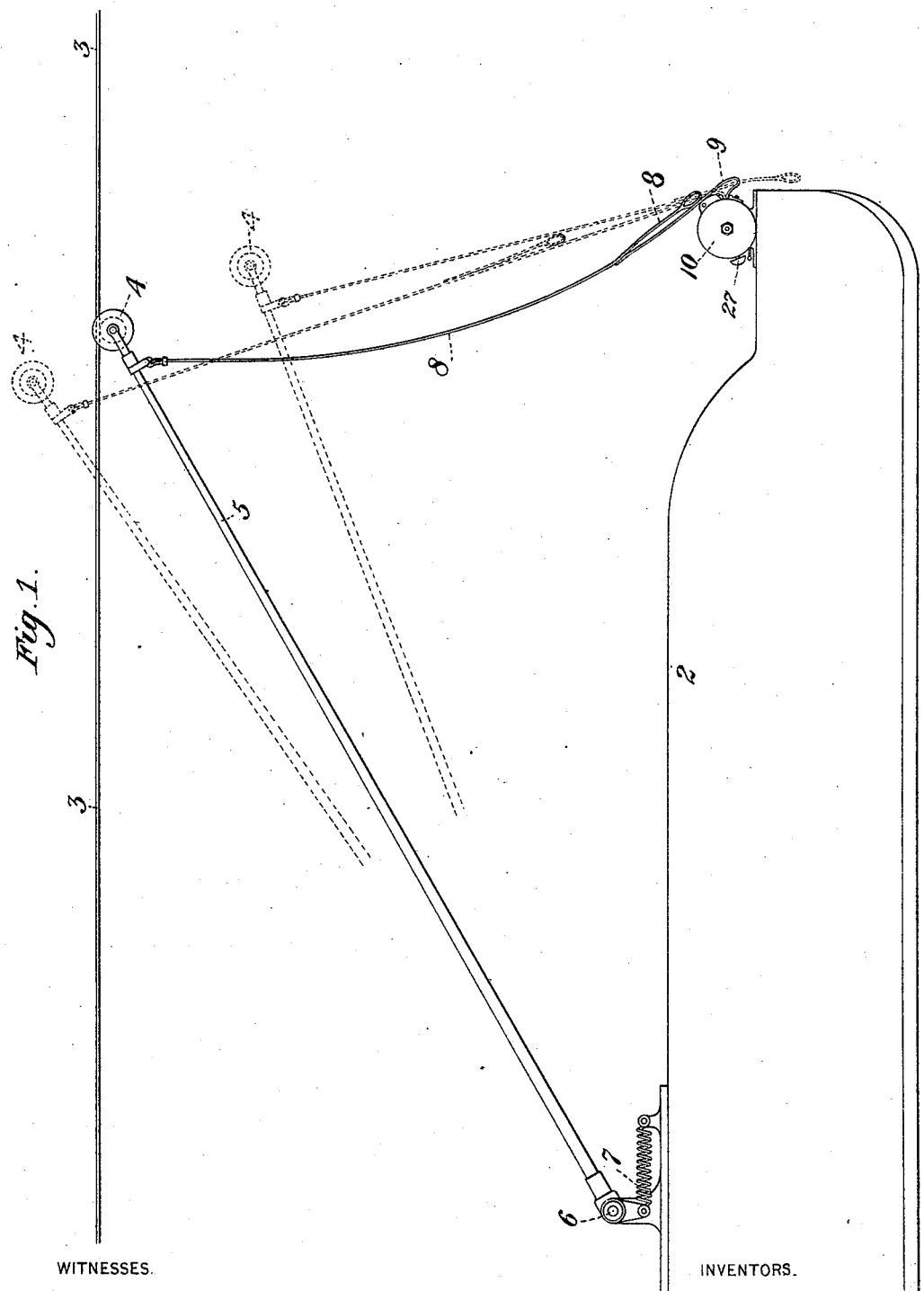

(No Model.) 3 Sheets—Sheet 3.

S. A. SHEPARD & F. P. LANG.
AUTOMATIC TROLLEY CATCH.

No. 469,750. Patented Mar. 1, 1892.

WITNESSES
Thomas W. Bakewell
H. M. Corwin

INVENTORS
Stephen A. Shepard
Frederick P. Lang

THE NORRIS PETERS CO., PHOTO-LITHO., WASHINGTON, D. C.

UNITED STATES PATENT OFFICE.

STEPHEN A. SHEPARD AND FREDERICK P. LANG, OF ALLEGHENY, PENNSYLVANIA; SAID LANG ASSIGNOR OF ONE-FOURTH TO SAID SHEPARD.

AUTOMATIC TROLLEY-CATCH.

SPECIFICATION forming part of Letters Patent No. 469,750, dated March 1, 1892.

Application filed August 7, 1891. Serial No. 401,970. (No model.)

*To all whom it may concern:*

Be it known that we, STEPHEN A. SHEPARD and FREDERICK P. LANG, both of Allegheny, in the county of Allegheny and State of Pennsylvania, have invented a new and useful Improvement in Automatic Trolley-Catches, of which the following is a full, clear, and exact description, reference being had to the accompanying drawings, forming part of this specification, in which—

Figure 8:
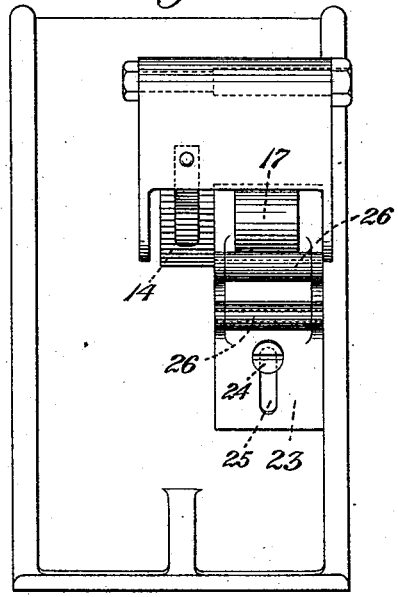
Figure 9:
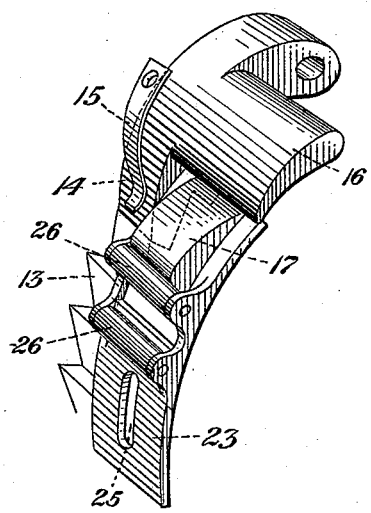
Figure 10:
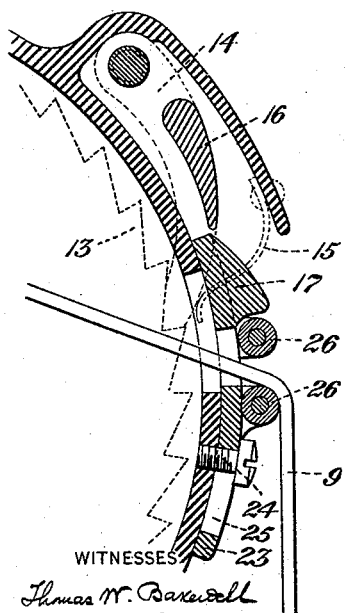
Figure 11:
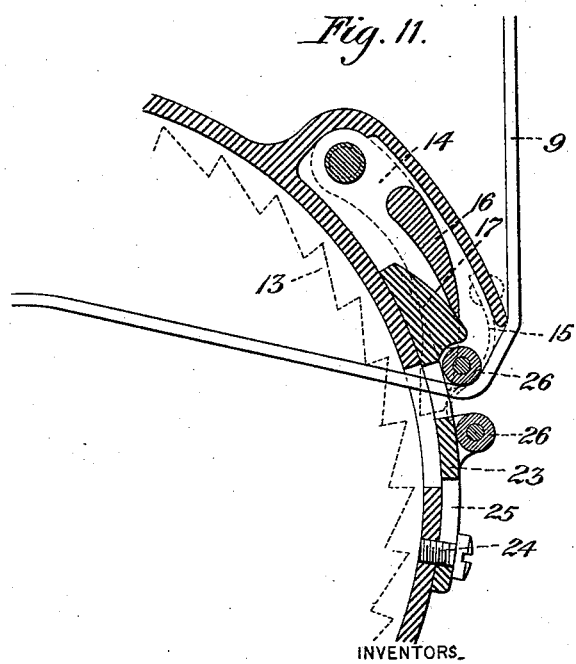

Figure 1 shows our improved trolley-catch applied to the top of an electric-motor car, the normal position of the trolley being illustrated by full lines, while its upper position, to which it springs when it leaves the wire, and its lower safety position, to which it is drawn by the trolley-catch, are illustrated by dotted lines. Fig. 2 is a side elevation of the case containing the operating mechanism of the trolley-catch. Fig. 3 is a vertical section thereof, the section plane being on the line III III of Fig. 7. Figs. 4, 5, and 6 are vertical sections on the lines IV IV, V V, and VI VI of Fig. 7, respectively. Fig. 7 is a vertical cross-section on the line VII VII of Fig. 2. The figures on Sheet 3 are on a larger scale. Fig. 8 shows the case in end elevation. Fig. 9 is a detached perspective view of the parts of the operating mechanism which lock the apparatus and which release it and cause the drawing down of the trolley when it has left the conductor on which it normally rides. Fig. 10 is a detail sectional view showing the main ratchet-wheel with the pawl in locking engagement therewith. Fig. 11 is a similar view showing the pawl disengaged from the ratchet.

Like symbols of reference indicate like parts in each.

In operating electric-railway motors having overhead conductors from which the electric current is carried to the motor by a trolley it frequently happens that in fast running or from various causes the trolley will jump the conducting-wire and the rod connecting it to the car will be thrown up by its spring so as to raise the trolley above the wire. The evil of this results principally from the fact that the then elevated trolley-rod is apt to catch and foul with the cross guy-wires by which the conducting-wire is supported and may break them when the car is running with considerable momentum. For this reason the liability of the trolley to jump the conducting-wire has been a source of frequent difficulty and of hinderance to traffic.

The object of our invention is to overcome the difficulty above indicated, and we accomplish this end by providing improved means by which when the trolley leaves the conducting-wire and springs upward it is automatically drawn down again below the level of the conductor, where it remains until it is replaced in proper traveling contact. In this way the fouling of the trolley-rod with the guy-wires is avoided, the running of the car is rendered safe, and much time and labor are saved. We may provide, also, as a supplement to this device an alarm-signal, which gives warning when the trolley leaves the conducting-wire, so that the operator of the car may replace it without delay.

In Fig. 1, 2 represents the roof of an electric-motor car. 3 is the overhead conducting-wire. 4 is the trolley-wheel, adapted to travel in contact with the under side of the wire and journaled to the end of a rod 5, which is pivoted to the car at 6 and is provided with a spring 7, which tends to elevate it, and thus to keep it in contact with the wire, the elevation of which usually varies at different points on the line. 8 is the usual cord, which is connected with the end of the trolley-rod and hangs within reach of the car-operator, so that by pulling it he may draw the trolley down from the conducting-wire. When the trolley jumps from the conducting-wire, the rod 5 rises to the position shown by dotted lines in Fig. 1, thus drawing on the cord 8 and on a strap 9, which is attached to the cord, and enters a case 10, which is mounted on the car and contains a spring-actuated spool, to which the strap is attached. By automatically-acting trip mechanism hereinafter described such tightening of the strap releases a detent, which holds said spool, and permits the spring to act, which spring then rotating the spool winds up the strap and draws the trolley-rod down to the position shown by the lower dotted lines, freeing it thus from the conducting-wire and the guy-wires. The trolley is there held until one of the operators on the car draws out the strap from the case, thus rewinding the spool-spring and permitting the trolley-rod spring 7 to raise the trolley once more to the level of the conducting-wire.

We shall now describe the construction of the case 10 with special reference to the figures on Sheets 2 and 3. The case may be made conveniently of cylindrical form, having one or both of its ends removable, and has a central shaft 11, on which a spool 12 is set revolubly. 13 is a ratchet-wheel fixed to or made integral with the spool, and 14 is a pawl pivoted in a recess at the side of the case and engaging the teeth of the ratchet, as shown in Figs. 5, 9, and 10. This pawl is held yieldingly in engagement with the ratchet by a spring 15 and has a laterally-projecting tongue 16, under which a wedge or slide 17 is adapted to move so as to force the pawl outwardly and to release it from the ratchet. The operation of this wedge will be explained hereinafter.

18 is a coiled spring, the inner end of which is fixed to the shaft 11 and the outer end of which is fixed by a pin 19 to the ratchet-wheel. Said spring is confined within a cylindrical shield 20, the disk-shaped end of which encircles the shaft 11.

21 is a ratchet-wheel keyed to the shaft and guarded by a spring-backed pawl 22. When the parts are thus constructed and arranged, the spring may be wound up on turning the shaft by applying a spanner to the squared portion or nut of the shaft at the exterior of the case. Such winding of the spring will impart a rotary tension to the spool, but unless the pawl 14 is released will not be free to turn it.

The strap 9 of the trolley-cord is attached at the end to the spool, as shown in Figs. 6 and 7, and passes out through a hole in the side of the case and through a slot formed in a slide-plate 23, which carries the wedge 17. Said plate is shaped to conform to the seat or surface of the case, against which it is set, and is held and guided by suitable means which permit it to have a sliding motion. The device illustrated for this purpose is a pin or bolt 24, which passes through a longitudinal slot 25 in the plate and is fixed to the case. At the sides of the slot in the plate through which the strap passes there are anti-friction rollers 26, the purpose of which is to reduce the friction on the strap and to permit it to move freely.

The operation of the apparatus is as follows: When the trolley is riding normally on the conducting-wire, the cord 8 and the strap 9 hang slackly, as shown in Fig. 1 by full lines and in Fig. 10. If now the trolley should leave the wire, its rod immediately rises, as above explained, thus tightening the cord 8 and drawing the strap upwardly, as shown in Fig. 11. Such tightening and pulling of the strap move the wedge-plate 23 upwardly, and cause the wedge 17 to pass beneath the tongue 16 and to release the pawl from the teeth of the ratchet 13. The spring 18, being then free to act, immediately rotates the spool, which, coiling around it the strap, draws down the trolley into the lowest position, (shown in Fig. 1,) clearing it from the conducting-wire and its supports. Warning is given of this by a bell 27, whose clapper-lever 28 extends within the case in the path of a pin 29 on the ratchet, Fig. 5, the revolution of the ratchet causing the pin to strike the lever and to sound the bell. When the operator wishes to replace the trolley, he seizes the cord 8 or the projecting portion of the strap 9 and draws it out from the apparatus, thus rotating the spool in the reverse direction and winding up the spring 18. In thus pulling the strap it exerts a downward pressure on the wedge-plate and pulls the wedge away from the tongue 16, thereby leaving the pawl free to spring into contact with the ratchet-wheel 13 and to hold the same from rotation. (See Fig. 10.) The strap, being thus slack, releases its strain on the trolley-rod, which can be suffered to rise, and the trolley can be guided back to its place on the conducting-wire.

In applying our improvement to cars intended to be driven in both directions there may be a spring-case applied to each end of the car and their straps adapted to be fastened by easily-detachable means to the trolley-cord, so that the advantages of our invention can be secured whether the trolley-rod be inclined in one direction or the other.

The skilled mechanic will be able to modify our improved device in many ways in respect of the construction, position, and relative arrangement of the parts without departure from the principles of our invention, as stated in the following claims.

We claim—

1. A trolley-catch comprising, in combination, spring-actuated mechanism connected with the trolley and adapted to depress the same, a detachable lock adapted to hold said mechanism, a tripping device actuated by rise of the trolley and adapted to free said lock, and an alarm-signal actuated on motion of said spring-actuated mechanism, substantially as and for the purposes described.

2. In a trolley-catch, the combination, with the spool, strap, and ratchet 13, of a spring connected with the ratchet, a pawl which locks the ratchet, a wedge adapted to engage the pawl, and a strap which bears on the wedge and is adapted to move the same, substantially as and for the purposes described.

3. In a trolley-catch, the combination, with the spool, strap, and ratchet 13, of a spring connected with the ratchet, a pawl which locks the ratchet, a wedge adapted to engage the pawl, an anti-friction roller on the wedge, and a strap which bears on said roller and is adapted to move the wedge, substantially as and for the purposes described.

4. In a trolley-catch, the combination, with the spool, strap, and ratchet 13, of a spring connected with the ratchet, a pawl which locks the ratchet, a wedge adapted to engage the pawl, a strap which bears on the wedge and is adapted to move the same, and means, substantially as described, for winding the spring, substantially as and for the purposes described.

In testimony whereof we have hereunto set our hands this 30th day of July, A. D. 1891.

STEPHEN A. SHEPARD.
   FREDERICK P. LANG.

Witnesses:
 R. H. WHITTLESEY,
 H. M. CORWIN.